United States Patent
Yost

Patent Number: 5,911,481
Date of Patent: Jun. 15, 1999

[54] POCKET HAND SAW

[76] Inventor: Timothy Yost, 225 Pat Dr., Mio, Mich. 48647

[21] Appl. No.: 08/940,494

[22] Filed: Sep. 30, 1997

[51] Int. Cl.$^6$ .............................. B23D 49/10; B23D 51/01
[52] U.S. Cl. .............................. 30/125; 30/166.3; 30/340; 30/517; 7/148; 7/167
[58] Field of Search .................................... 30/166.3, 144, 30/514, 517, 329, 332, 340, 342, 344, 125; 7/167, 148

[56] References Cited

U.S. PATENT DOCUMENTS

| | | | |
|---|---|---|---|
| 912,411 | 2/1909 | Putney | 30/125 |
| 2,262,540 | 11/1941 | Stone | 30/340 |
| 3,588,931 | 6/1971 | Jones | 7/148 |
| 3,851,986 | 12/1974 | Daughtry | 30/125 |
| 4,411,068 | 10/1983 | Theodorides | 30/166.3 |
| 4,620,369 | 11/1986 | Gercken | 30/344 |
| 5,752,285 | 5/1998 | Bendheim et al. | 7/167 |

Primary Examiner—Hwei-Siu Payer
Attorney, Agent, or Firm—Jerry Semer

[57] ABSTRACT

This invention is a small saw for hunters in which the blade of the saw can be stored in a water tight compartment in the handle. The handle of the saw is a tube with a closed bottom and a threaded opening on the top. The tube is adapted to hold saw blades that are not being used. A cap with an o-ring and a thread bottom seal the handle water tight. On top of the cap is a semi-circular piece. Along both sides of the flat side of the semi-circular piece are grooves. In the middle of the flat side at the bottom of the flat side there is a threaded opening. Above the threaded opening in the middle is a small indent. The saw blade is placed on the flat side of the semi-circular piece. Over the saw blade is placed a U-shaped piece. The arms of the U fit within the ridges on the semi-circular piece. At the middle of the bottom of the U-shaped piece, is an opening that aligns with the threaded opening in the semi-circular piece. A knob with bolt is adapted to fit through the opening in the U-shaped piece and thread into the threaded opening in the semi-circular piece. The knob is adapted such that when it is threaded into the openings, it puts pressure on the U-shaped piece which holds the blade in place.

13 Claims, 4 Drawing Sheets

5,911,481

POCKET HAND SAW

FIELD OF INVENTION

This invention relates to a pocket hand saw and more particularly to a pocket hand saw that can use a plurality of blades that fit within the handle.

BACKGROUND OF THE INVENTION

Sportsmen often require small hand tools for the pursuit of their chosen endeavor and in fact their lives may at times depend on such tools. Ordinary hand tools, as used by the populace, generally have been used by sportsmen, but generally they are not too well adapted to such use, especially because of the lack of versatility and dependability, both of which are desirable because the tools may need to be carried substantial distances. Thus, one of the objectives of this invention is to devise a saw that can be easily carried and is of light weight.

There have been attempts to do this in the prior art. One of those are Wilkens, U.S. Pat. No. 4,672,745. In this case the inventor has made a handle which several types of saw blades attach to. The problem with this invention is that there is no room in the handle to store the blade. Plus, the individual would have to carry the handle and the blade separately and there would be more possibility that the blade would be lost. Also, in case of wet weather, the blade, since it is not carried in anything, could get wet and rust. Thus, one of the objectives of this invention is to devise an invention that when the blade is not in use it can be stored easily in the handle. A further objective of this invention is to ensure that the storage compartment for the blades in the handle is water tight so that there is no possibility of the blades getting wet and rusting. There have been several attempts in the prior art to put the blade in the handle. These include R. D. Philbrick, U.S. Pat. No. 2,735,463, Pape et al, U.S. Pat. No. 5,023,996, Flood, U.S. Pat. No. 4,884,307 and R. C. Dreier, U.S. Pat. No. 2,966,931. The problem with all of these patents are they make a specially designed blade to fit within the handle. Applicant has designed his saw to take regular blades that are sold for popular hand saws. Thus, the blades can be regularly purchased anywhere. Further, none of these handles have the provision to make the handle water tight so that it can be especially used for hunters and outdoor sportsmen.

SUMMARY OF THE INVENTION

This invention is a small saw for hunters in which the blade of the saw can be stored in a water tight compartment in the handle. The handle of the saw is a tube with a closed bottom and a threaded opening on the top. The threaded opening on the top is adapted such that the saw blade will pass through it. On top of the handle, a cap is placed. Said cap's bottom is threaded such that it will thread over the threads of the handle. Also, within the threaded opening, an O ring is placed at the top so that when the cap is threaded on the handle, the O ring will be compressed by the threading together. The tightening of the cap and the handle seals the compartment water tight. The top of the cap is adapted to hold the saw blade. On top of the cap is placed a semi-circular piece. The flat side of the semi-circular piece is in the horizontal plane. Along both sides of the flat side of the semi-circular piece are grooves. In the middle of the flat side at the bottom of the flat side there is a threaded opening. Above the threaded opening in the middle is a small indent. The saw blade is placed on the flat side of the semi-circular piece. The saw blade has an arm that sticks out of the bottom of the blade and is put up against the top of the cap. An opening on the blade is aligned with a small indent above the threaded opening. Over the saw blade is placed a U-shaped piece. The U-shaped piece has a flat bottom which is the same size as the flat side of the semi-circular piece. The arms of the U fit within the ridges on the semi-circular piece. At the middle of the flat bottom of the U-shaped piece, an opening is placed and said opening aligns with the threaded opening in the semi-circular piece. Just above the opening in the U-shaped piece, there is a small bump. Said bump aligns with the opening in the saw blade and the small indent in the semi-circular piece. A knob with bolt is adapted to fit through the opening in the U-shaped piece and thread into the threaded opening in the semi-circular piece. The knob is adapted such that when it is threaded into the opening, it puts pressure on the U-shaped piece which holds the blade in place.

A BRIEF DESCRIPTION OF THE DRAWINGS

DETAILED DESCRIPTION OF THE PREFERRED EMBODIMENT

Figure 1:
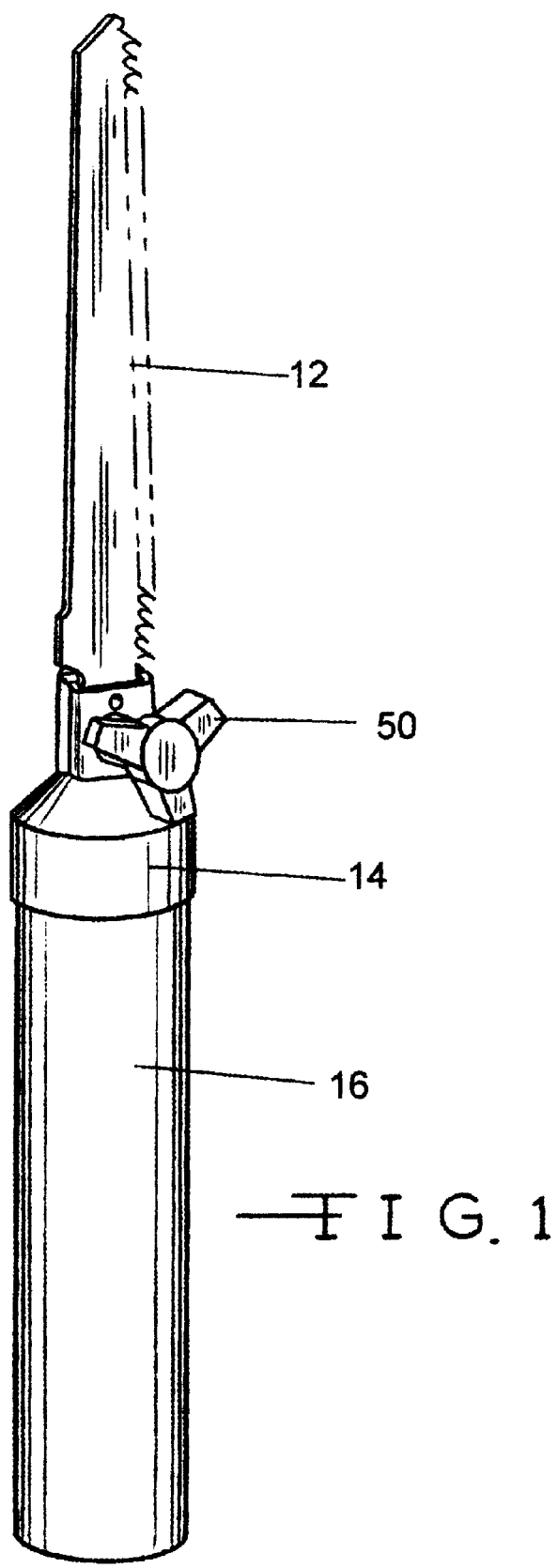
FIG. 1 is a perspective view of the invention.

FIG. 1 shows the invention. Three major parts of the invention are the saw blade 12, the cap 14 and the handle 16. From FIG. 1, one can see the handle 16 is cylindrical in shape.

Figure 2:
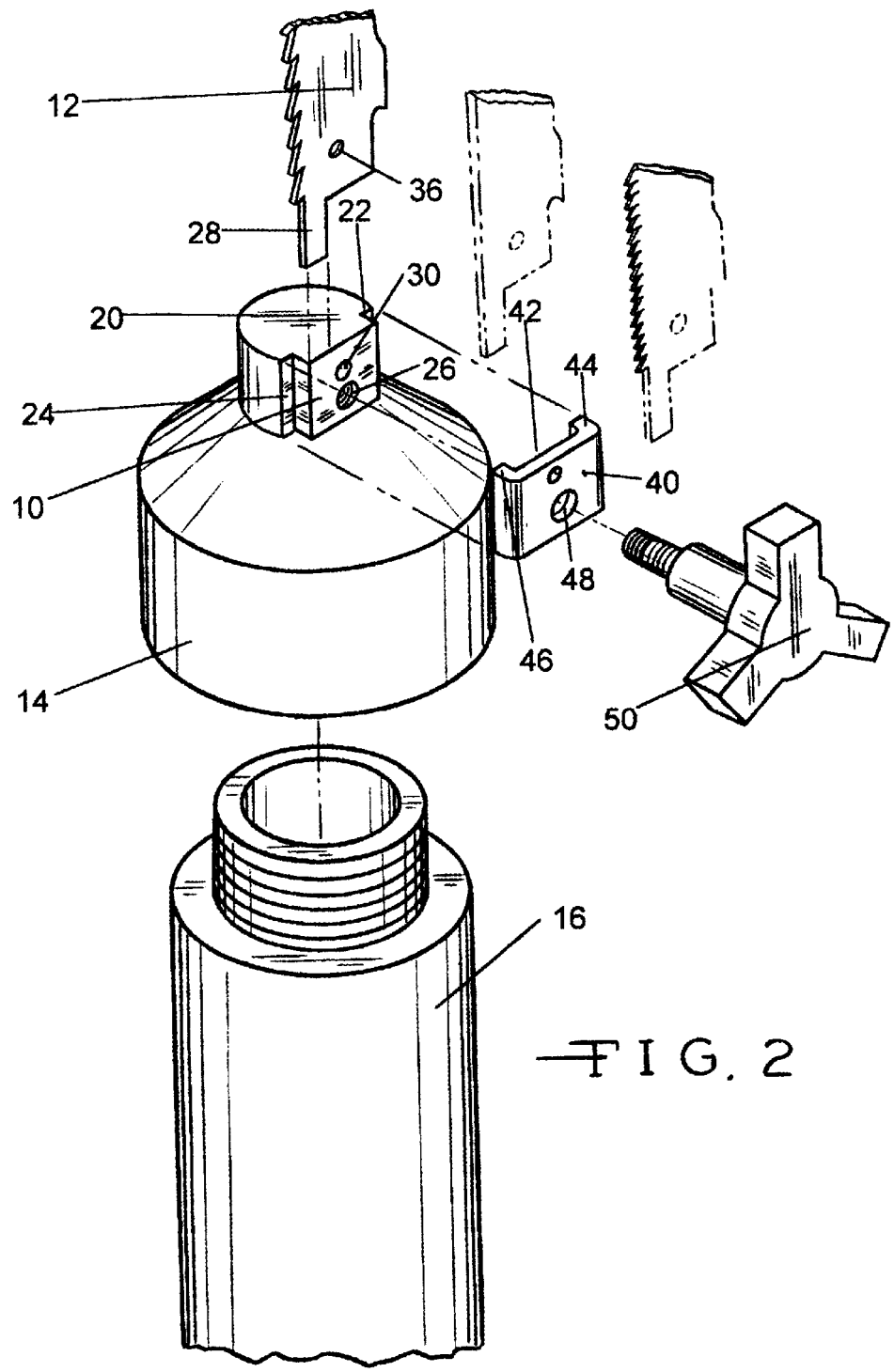
FIG. 2 is an exploded view of the mid section of the invention.
Figure 3:
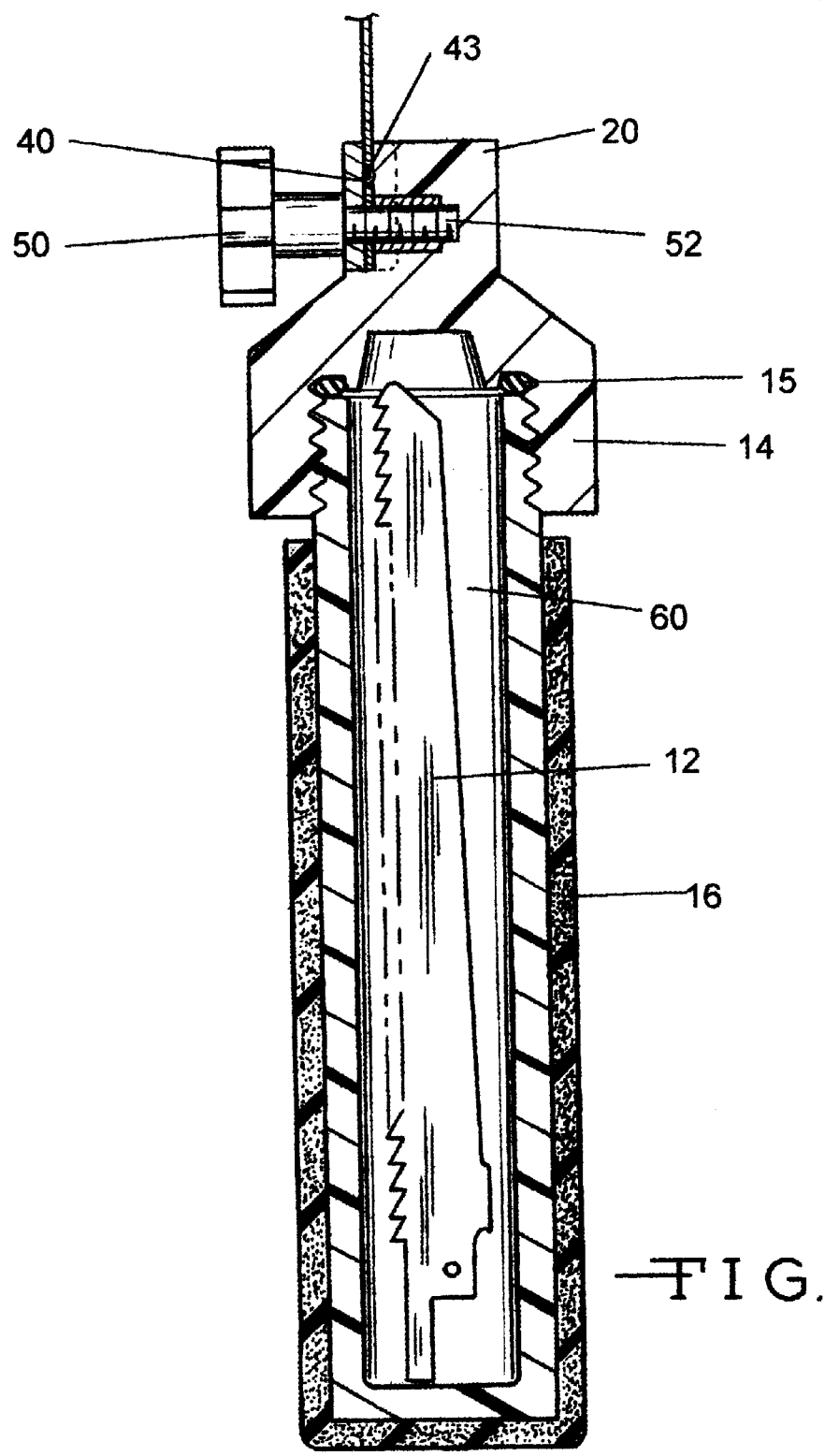
FIG. 3 is a cut away view of the handle and cap of the invention.

FIG. 2 shows the top of the handle 16 with the cap 14 removed. FIG. 2 shows that the top of the handle has a threaded opening that extends out from the top of the handle and this threaded opening is adapted to thread into the cap 16 as shown in FIG. 3. FIG. 2 also shows the cap and how the saw blade is attached to the cap. The cap 16 on the top has a semi-circular piece 20 that is integrally attached to the cap 16. The semi-circular piece 20 is attached at its end to the cap 16. The flat side 10 of the semi-circular piece 20 has two ridges, one at each side, 22 and 24. In the center at the bottom of the flat side 10 of the semi-circular piece 10, is a threaded opening 26. Above the threaded opening 26 is an indention 30. The saw blade 12 is a standard saw blade that is used in many hand held saws. It can be bought in almost any hardware store. Saw blade 12 at its bottom has an arm 28. A little ways above the bottom, saw blade 12 has an opening 36. Saw blade 12 is placed against the flat side 10 of the semi-circular piece 20 such that the arm 28 fits up against the ridge 22 or 24 of the flat side as shown in FIG. 2. The opening 36 in the saw blade 12 aligns with the indention 30 in the flat side 10. Over the saw blade 12 is placed a U shaped piece 40. The flat bottom 42 of the U shaped piece 40 fits over the flat side 10 of the semi-circular piece 20 and the arms 44 and 46 of the U shaped piece 40 fit within the two ridges 22 and 24 on the flat side 10 of the semi-circular piece 20. At the bottom 42 of the flat side of the U shaped piece 40 there is an opening 48 that passes through the U shaped piece 40. When the U shaped piece 40 is fitted over the semi-circular piece 20 such that the two arms 44 and 46 of the U shaped piece 40 fit within the ridges 22 and 24 of the semi-circular piece 20, the opening 48 aligns with the threaded opening 26 in the semi-circular piece 20. Just above the opening 48 in the U-shaped piece 40 there on the inside of the flat bottom 42 shaped piece, there is a bump 41. This bump 41 can be seen better in FIG. 3. This bump 41 fits through the opening 36 in the saw blade 12 and into the indention 30 on the flat side 10 of the semi-circular piece 20.

A knob 50 with a bolt 52 is adapted to fit through the opening 48 in the U shaped piece 40 and threaded into the threaded opening 26 in the semi-circular piece 20. The bolt 52 is of a length sufficient that when it is threaded into the semi-circular piece 20, the bottom of the knob 50 comes in contact with the top of the U shaped piece 40. The knob 50 with the bolt 52 can be threaded into the semi-circular piece 20 a sufficient distance that it can put enough pressure on the U shaped piece 40 that it can hold the U shaped piece 40 and the saw blade 12 solidly into place. FIG. 3 shows the saw blade 12, knob 50, U shaped piece 40, and the semi-circular piece 20 all in proper position to hold the saw blade 17.

FIG. 3 also shows that the handle 16 has a compartment 60. Within this compartment 60 a saw blade 12 can be placed and the cap 14 can fit upon the handle 16. Thus, the compartment 60 inside the handle 16 forms a storage case for extra saw blades 12. FIG. 3 shows the cap 14 threaded on the top of the handle 16. FIG. 3 also shows that the cap 14 has an O ring 15 that is compressed when the handle 16 is threaded into the cap 14. This O ring 15 forms a water tight seal so that when the saw blade 12 is being carried in inclement weather or through water, no water can seep into the compartment 60 for the saw blades 12 and rust them.

Figure 4:
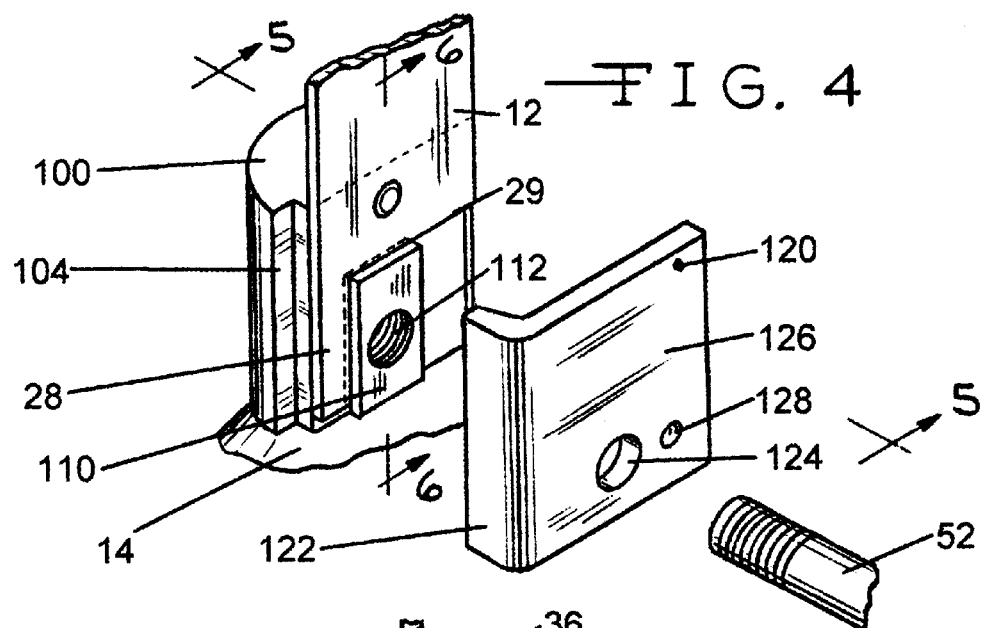
FIG. 4 is an exploded view of another embodiment of the section for attaching the saw blade to the handle.
Figure 5:
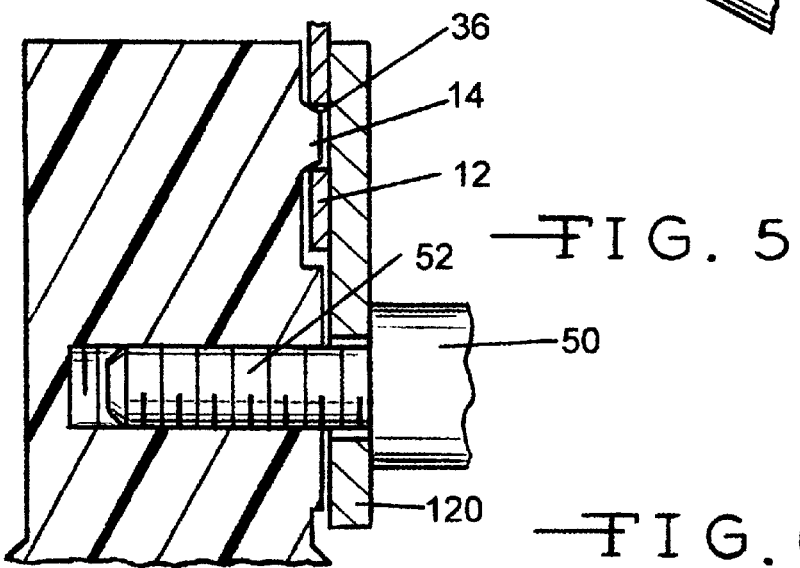
FIG. 5 is a sectional view along lines 5—5 of FIG. 4.
Figure 6:
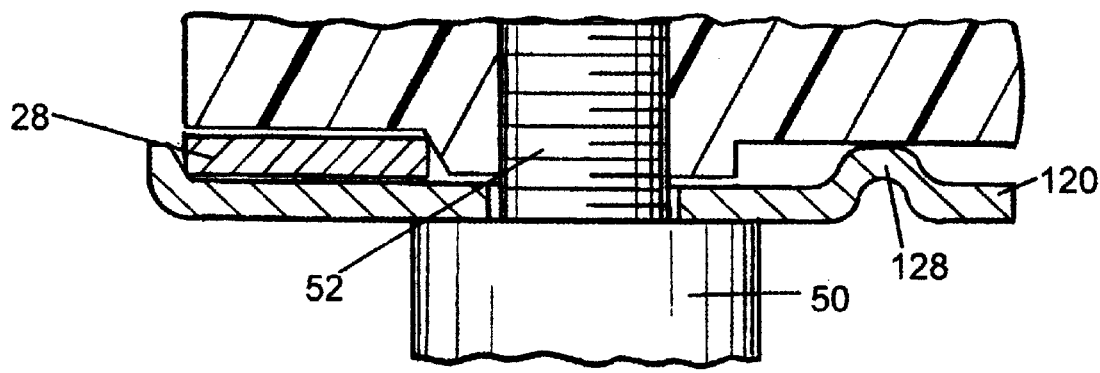
FIG. 6 is a sectional view along lines 6—6 of FIG. 4.

FIGS. 4, 5 and 6 show another embodiment for attaching the saw blade 12 to the handle 16. In this embodiment as in the previous embodiment on top of the cap 14 is a semi-circular piece 100. However, unlike the previous embodiment the flat side of the semi-circular piece 100 has a ridge 104 only on one side. At the bottom, near the center of the semi-circular piece 100, is a threaded opening. Also, in the center at the bottom of the semi-circular piece 100 a block 110 is integrally attached to the semi-circular piece 100. This block 110 has a threaded opening 112 which aligns with the threaded opening in the semi-circular piece 100. Just above the block 110 on the semi-circular piece 100 is a bump 114. When the saw center blade 12 is placed on the semi-circular piece 100, the arm 28 and the bottom 29 of the saw blade 12 fit around the block 110 on the semi-circular piece 100. The bump 114 is aligned to fit within the opening 36 in the saw blade 12. This is clearly shown in FIG. 5. An L shaped piece 120 is placed over the saw blade 12 and the semi-circular piece 100. The foot 122 of the L fits within the ridge 104 on the one side of the semi-circular piece 100. The side 126 of the L fits over the flat side of the semi-circular piece 100. An opening 124 in the lower part of the side 126 of the L aligns with the opening 112 in the semi-circular piece 100. Between the opening 124 and the side 126 of the L a bump 128 protrudes from the inside of the side 126 of the L.

To put the saw blade 12 on the handle 16, the saw blade 12 is placed up against the semi-circular piece 100 with the bottom of the saw blade 29 sitting on the top of the block 110 and the arm 28 of the saw blade 12 sitting down the side of the block 110. The arm 28 of the saw blade 12 is exactly the same or slightly less than the area between the block 110 and the ridge 104 on the flat surface of the semi-circular piece 100. The opening 36 of the saw blade 12 fits over the bump 114 in the semi-circular piece 100. The L shaped piece 120 is next moved in position with its opening 124 aligned with the threaded opening 112 in the semi-circular piece 100. A knob 50 with a bolt 52 is then put through the opening 124 in the L shaped piece 120 and threaded opening 112 into the semi-circular piece 100. The bottom of the knob 50 comes into contact with the L shaped piece 120 putting a sufficient pressure on the L shaped piece 120 to hold the saw blade 12 securely in place as shown in FIG. 5 and 6. The bump 128 on the inside of the L shaped piece 120 makes contact with the semi-circular piece 100 to hold the L shaped piece 120 more securely against the semi-circular piece 100 and the saw blade 12. This can be seen clearly in FIG. 6.

Changes and modifications in the specificity described embodiments can be carried out without departing from the scope of the invention which is intended to limited only by the scope of the appending claims.

I claim:

1. A pocket hand saw comprising:
   a saw blade with a bottom and an opening and said saw blade has an arm extending from the bottom of the saw blade with two edges and a width;
   a handle,
   a chamber in the handle for storage of the saw blade and having a single opening and said chamber is of a sufficient size to hold the entire saw blade;
   a means for sealing the single opening of the chamber;
   a means for attaching the saw blade to the sealing means so that the blade can be used for sawing, said attaching means comprising:
      a flat piece with sides and a middle attached to the sealing means and said flat piece has ridges on each side thereof and said flat piece has a large threaded opening near its middle just above the large threaded opening is a small indention;
      said flat piece is adapted such that when the saw blade is placed upon the flat piece the indention in the flat piece aligns with the opening in the saw blade;
      a U-shaped piece with a flat bottom, sides and an inside, and said U-shaped piece is adapted such that the sides of the U-shaped piece fit within the ridges of the flat piece, and in the middle of the flat bottom of the U-shaped piece there is an opening that aligns with the opening on the flat piece when the U-shaped piece is placed upon the flat piece and the sides of the U-shaped piece are placed within the ridges and there is a bump on the inside of the U-shaped piece that aligns with both the opening in the saw blade and the indention in the flat piece when the saw blade is placed on the flat piece;
      a knob with a bolt that is adapted to fit through the opening in the U-shaped piece and thread into the threaded opening in the flat piece and said knob has a flat bottom;
   whereas, the saw blade can be either stored in the handle or attached to the sealing means by the means for attaching the saw blade to the sealing means so that the saw blade can be used for sawing.

2. A pocket hand saw as in claim 1 wherein:
   the single opening of the chamber is threaded;
   the means for sealing the opening of the chamber is a threaded cap.

3. A pocket hand saw as in claim 2 wherein:
   the threaded cap has an O ring such that when the cap is threaded upon the chamber, the O ring compresses and creates a water tight seal.

4. A pocket hand saw as in claim 2 wherein:
   the means for sealing the single opening of the chamber seals the chamber water tight.

5. A pocket hand saw comprising:
  a saw blade with a bottom and an opening and said saw blade has an arm extending from the bottom of the saw blade with two edges and a width;
  a handle;
  a chamber in the handle for storage of the saw blade and having a single opening and said chamber is of a sufficient size to hold the entire saw blade;
  a means for sealing the single opening of the chamber;
  a means for attaching the saw blade to the sealing means so that the blade can be used for sawing;
  whereas, the saw blade can be either stored in the handle or attached to the sealing means by the means for attaching the saw blade to the sealing means so that the blade can be used for sawing.

6. A pocket hand saw as in claim 5 wherein:
  the means for sealing the chamber seals the chamber water tight.

7. A pocket hand saw as in claim 6 wherein:
  the single opening of the chamber is threaded;
  the means for sealing the opening of the chamber is a threaded cap.

8. A pocket hand saw as in claim 7 wherein:
  the treaded cap has an O ring such that when the cap is threaded upon the chamber, the O ring compresses and creates a water tight seal.

9. A pocket hand saw as in claim 7 wherein:
  the means for attaching the saw blade comprises:
    a flat piece with sides and a middle attached to the sealing means and said flat piece has ridges on each side thereof and said flat piece has a large threaded opening near its middle just above the large threaded opening is a small indention;
    said flat piece is adapted such that when the saw blade is placed upon the flat piece the indention in the flat piece aligns with the opening in the saw blade;
    a U-shaped piece with a flat bottom, sides and an inside and said U-shaped piece is adapted such that the sides of the U-shaped piece fit within the ridges of the flat piece, and in the middle of the flat bottom of the U shaped piece there is an opening that aligns with the opening on the flat piece when the U-shaped piece is placed upon the flat piece and the sides of the U-shaped piece are placed within the ridges and there is a bump on the inside of the U-shaped piece that aligns with both the opening in the saw blade and the indention in the flat piece when the saw blade is placed on the flat piece,
    a knob with a bolt that is adapted to fit through the opening in the U-shaped piece and thread into the threaded opening in the flat piece and said knob has a flat bottom.

10. A pocket hand saw as in claim 9 wherein:
  the threaded cap has an O ring such that when the cap is threaded upon the chamber, the O ring compresses and creates a water tight seal.

11. A pocket hand saw as in claim 5 wherein:
  the means for attaching the saw blade comprises:
    a flat piece with sides and a middle attached to the sealing means and said flat piece has ridges on each side thereof and said flat piece has a large threaded opening near its middle just above the large threaded opening is a small indention;
  said flat piece is adapted such that when the saw blade is placed upon the flat piece the indention in the flat piece aligns with the opening in the saw blade;
    a U-shaped piece with a flat bottom, sides and an inside, said U-shaped piece is adapted such that the sides of the U-shaped piece fit within the ridges of the flat piece, and in the middle of the flat bottom of the U-shaped piece there is an opening that aligns with the opening on the flat piece when the U-shaped piece is placed upon the flat piece and the sides of the U-shaped piece are placed within the ridges and there is a bump on the inside of the U-shaped piece that aligns with both the opening in the saw blade and the indention in the flat piece when the saw blade is placed on the flat piece,
    a knob with a bolt that is adapted to fit through the opening in the U-shaped piece and thread into the threaded opening in the flat piece and said knob has a flat bottom.

12. A pocket hand saw as in claim 11 wherein:
  the means for sealing the chamber seals the chamber water tight.

13. A pocket hand saw comprising:
  a handle;
  a chamber in the handle and having a single opening and said chamber is of sufficient size to hold an entire saw blade;
  a means for sealing the single opening of the chamber,
  a means for attaching the saw blade to the sealing means so the saw blade can be used for sawing, said means for attaching comprising;
    a flat piece with sides and a middle attached to the sealing means and said flat piece has ridges on at least one side thereof and said flat piece has a large threaded opening near its middle;
    a covering piece with sides and along one of said sides is a flap which is adapted to fit within the ridges of the flat piece and near the middle of said covering piece is an opening adapted to align with the opening in the flat piece;
    a knob with a bolt that is adapted to fit through the opening in the covering piece and thread into the threaded opening in the flat piece and said knob has a flat bottom.

* * * * *